US010585673B2

(12) United States Patent
Nguyen et al.

(10) Patent No.: US 10,585,673 B2
(45) Date of Patent: Mar. 10, 2020

(54) CHIPSET RECONFIGURATION BASED ON DEVICE DETECTION

(71) Applicant: HEWLETT PACKARD ENTERPRISE DEVELOPMENT LP, Houston, TX (US)

(72) Inventors: Vincent Nguyen, Houston, TX (US); Hung Quoc Phu, Houston, TX (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 0 days.

(21) Appl. No.: 15/545,628

(22) PCT Filed: Feb. 10, 2015

(86) PCT No.: PCT/US2015/015296
§ 371 (c)(1),
(2) Date: Jul. 21, 2017

(87) PCT Pub. No.: WO2016/130114
PCT Pub. Date: Aug. 18, 2016

(65) Prior Publication Data
US 2018/0011716 A1 Jan. 11, 2018

(51) Int. Cl.
G06F 9/4401 (2018.01)
G06F 13/38 (2006.01)
(Continued)

(52) U.S. Cl.
CPC .......... G06F 9/4411 (2013.01); G06F 1/3287 (2013.01); G06F 9/4418 (2013.01);
(Continued)

(58) Field of Classification Search
CPC .. G06F 1/3287; G06F 9/4418; G06F 11/3034; G06F 11/3041; G06F 11/3051; G06F 13/385; G06F 13/4282
(Continued)

(56) References Cited

U.S. PATENT DOCUMENTS 4,803,623 A    2/1989  Klashka et al.
5,210,855 A *  5/1993  Bartol ................ G06F 13/4081
                                               710/107
(Continued)

FOREIGN PATENT DOCUMENTS

EP    2778936 A1    9/2014
TW    M259231 U    3/2005

OTHER PUBLICATIONS

International Search Report and Written Opinion, International Application No. PCT/US2015/015296, dated Nov. 10, 2015, pp. 1-10, KIPO.
(Continued)

Primary Examiner — Paul R. Myers
(74) Attorney, Agent, or Firm — Hewlett Packard Enterprise Patent Department

(57) ABSTRACT

Example implementations relate to chipset reconfiguration based on device detection. For example, a method includes detecting, by a computing system, that a storage device is connected to an input/output (I/O) interface of the computing system, and reconfiguring a chipset of the computing system based on the detected storage device. The method also includes performing a power cycle on chipset standby power to trigger a chipset configuration reload.

15 Claims, 2 Drawing Sheets

(51) Int. Cl.
    *G06F 1/3287* (2019.01)
    *G06F 11/30* (2006.01)
    *G06F 13/42* (2006.01)

(52) U.S. Cl.
    CPC ...... *G06F 11/3034* (2013.01); *G06F 11/3041* (2013.01); *G06F 11/3051* (2013.01); *G06F 13/385* (2013.01); *G06F 13/4282* (2013.01)

(58) Field of Classification Search
    USPC .......................................... 710/301–304, 10
    See application file for complete search history.

(56) References Cited

U.S. PATENT DOCUMENTS

| | | | | |
|---|---|---|---|---|
| 5,237,689 | A * | 8/1993 | Behnke | G06F 3/0601 |
| | | | | 710/10 |
| 5,379,382 | A | 1/1995 | Work et al. | |
| 5,805,834 | A | 9/1998 | McKinley et al. | |
| 6,295,556 | B1 * | 9/2001 | Falcon | H04L 67/34 |
| | | | | 707/999.007 |
| 6,658,552 | B1 * | 12/2003 | Klein | G06F 12/0886 |
| | | | | 711/165 |
| 6,769,059 | B1 * | 7/2004 | Qureshi | G06F 8/65 |
| | | | | 713/2 |
| 7,024,547 | B2 * | 4/2006 | Kartoz | G06F 9/4411 |
| | | | | 713/1 |
| 7,076,648 | B2 * | 7/2006 | Yakovlev | G06F 9/4411 |
| | | | | 710/15 |
| 7,099,969 | B2 | 8/2006 | McAfee et al. | |
| 7,130,992 | B2 * | 10/2006 | Poisner | G06F 9/445 |
| | | | | 713/1 |
| 7,440,998 | B2 | 10/2008 | Hiray et al. | |
| 7,568,056 | B2 * | 7/2009 | Danilak | G06F 3/0607 |
| | | | | 710/36 |
| 7,636,795 | B2 | 12/2009 | Hess et al. | |
| 7,793,089 | B2 | 9/2010 | Leigh et al. | |
| 8,296,469 | B2 | 10/2012 | Dunstan et al. | |
| 8,677,362 | B2 | 3/2014 | Im et al. | |
| 2003/0110368 | A1 * | 6/2003 | Kartoz | G06F 9/4411 |
| | | | | 713/1 |
| 2004/0123088 | A1 * | 6/2004 | Poisner | G06F 9/4403 |
| | | | | 713/1 |
| 2004/0243797 | A1 * | 12/2004 | Yang | G06F 9/4401 |
| | | | | 713/2 |
| 2005/0086494 | A1 * | 4/2005 | Carley | G06F 21/71 |
| | | | | 713/182 |
| 2005/0216721 | A1 * | 9/2005 | Zimmer | G06F 9/4401 |
| | | | | 713/2 |
| 2006/0044950 | A1 * | 3/2006 | Tung | G06F 3/14 |
| | | | | 369/30.01 |
| 2006/0080565 | A1 * | 4/2006 | Hsieh | G06F 1/10 |
| | | | | 713/400 |
| 2006/0136611 | A1 | 6/2006 | Futral et al. | |
| 2006/0248241 | A1 * | 11/2006 | Danilak | G06F 3/0607 |
| | | | | 710/36 |
| 2006/0274874 | A1 * | 12/2006 | Kumar | H03L 7/0814 |
| | | | | 375/362 |
| 2007/0162632 | A1 * | 7/2007 | Ng | G06F 3/14 |
| | | | | 710/15 |
| 2007/0173959 | A1 * | 7/2007 | Chandhoke | G05B 19/056 |
| | | | | 700/40 |
| 2007/0174518 | A1 * | 7/2007 | Chandhoke | G05B 19/054 |
| | | | | 710/62 |
| 2008/0195854 | A1 * | 8/2008 | Choi | G06F 9/445 |
| | | | | 713/2 |
| 2008/0288661 | A1 | 11/2008 | Galles | |
| 2008/0307502 | A1 | 12/2008 | Hung | |
| 2008/0313381 | A1 | 12/2008 | Leigh et al. | |
| 2009/0109348 | A1 * | 4/2009 | Tung | G06F 3/14 |
| | | | | 348/739 |
| 2009/0221363 | A1 * | 9/2009 | Brunet de Courssou | |
| | | | | G07F 17/32 |
| | | | | 463/25 |
| 2010/0095138 | A1 * | 4/2010 | Huang | G06F 1/24 |
| | | | | 713/300 |
| 2011/0153903 | A1 * | 6/2011 | Hinkle | G06F 13/20 |
| | | | | 710/313 |
| 2011/0154011 | A1 | 6/2011 | Efraim et al. | |
| 2011/0161672 | A1 | 6/2011 | Martinez et al. | |
| 2012/0239918 | A1 | 9/2012 | Huang | |
| 2016/0054933 | A1 * | 2/2016 | Haghighi | G06F 3/0611 |
| | | | | 711/103 |

OTHER PUBLICATIONS

CryptoManager Platform, "Secure Foundation for Connected Devices", available online at <https://web.archive.org/web/20141218060418/http://www.rambus.com/solutions/security/cryptomanager-plafform>, Dec. 18, 2014, 3 pages.

* cited by examiner

CHIPSET RECONFIGURATION BASED ON DEVICE DETECTION

BACKGROUND

In computer systems, a chipset is a set of electronic components in an integrated circuit that manages data flow between the processor, memory, and peripherals. The chipset controls communication between the processor and external devices. Computing systems can include input/output (I/O) interfaces/ports for connecting external devices to the computing systems.

BRIEF DESCRIPTION OF THE DRAWINGS

Some examples of the present application are described with respect to the following figures.

DETAILED DESCRIPTION

Examples describe herein provide a dynamic reconfiguration of chipset input/output (I/O) ports based on device detection. In typical computing systems, I/O ports are predefined based on chipset management engine (ME) firmware configurations. Once selected and programmed in ME firmware, the chipset I/O interconnect configurations are fixed for the entire life of the computing system.

According to the described solution, chipset I/O ports are flexible and dynamically changed to reflect system hardware personality of devices such as direct attached storage devices (e.g., peripheral component interconnect express (PCIe), serial ATA (SATA) or universal serial bus (USB)). Examples herein can eliminate the need for multiple stock keeping unit (SKU) with different backplane options to support different customer configurations of the attached storage device requirements, and also significantly reduce overhead costs associated with multiple platform SKU options.

In one example, a method includes detecting, by a computing system, that a storage device is connected to an I/O interface of the computing system, and reconfiguring a chipset of the computing system based on the detected storage device. The method also includes performing a power on cycle on chipset standby power to trigger a chipset configuration reload.

In another example, a computing system includes a storage device detection module to detect a storage device connected to an I/O port of the computing system and to determine a type of the storage device. The computing system includes a chipset management module to reconfigure a chipset of the computing system based on the detected storage device. The computing system also includes a power cycle module to perform a power cycle on chipset standby power to trigger a chipset configuration reload.

In another example, a non-transitory computer-readable storage medium encoded with instructions executable by a processor of a computing system includes instructions to detect that a storage device is connected to an I/O interface of the computing system, and reconfigure a chipset of the computing system based on the detected storage device. The computer-readable storage medium also includes instructions executable to perform a power cycle on chipset standby power to trigger a chipset configuration reload and to update I/O interface mappings upon an occurrence of a subsequent power-on sequence of the computing system.

Figure 1:
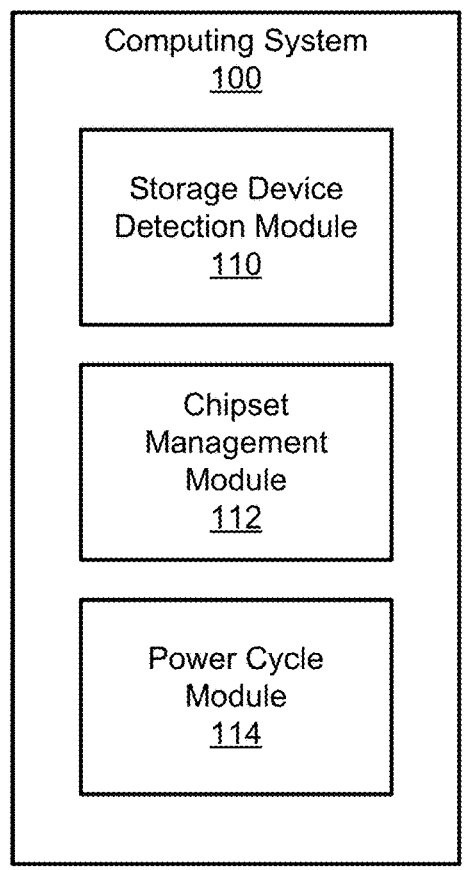
FIG. 1 is a block diagram of a computing system to reconfigure a chipset based on device detection, according to an example.

Referring now to the figures, FIG. 1 is a block diagram of a computing system to reconfigure a chipset based on device detection, according to an example. System 100 can be any type of computing system such as a portable computer or communication device, a standalone server computer, a blade server, etc. System 100 can include a plurality of modules such as storage device detection module 110, chipset management module 112, and power cycle module 114. Modules 110, 112, and 114 can be implemented in software, firmware and/or hardware. Thus, system 100 can include embedded firmware and hardware components for chipset reconfiguration based on device detection. It should be noted that system 100 can include additional components (not shown) such as a central processing unit (CPU), memory device, power supply, display, other hardware, software applications, a plurality of I/O ports/interfaces, etc.

Storage device detection module 110 can detect a storage device connected to an I/O port of the system 100 and determine the type of storage device. For example, the storage device detection module 110 can utilize backplane or a number of system discovery architectures available during standby (e.g., S5 power state) and running (e.g., S0 power state) modes of the system 100. Further, the storage device detection module 110 can determine the type of storage device connected to the system 100. For example, the storage device detection module 110, via inter-integrated circuit (I2C) busses connected to the system's field replaceable unit (FRU) or directly to the storage device, can determine the type of storage device connected to the system's I/O port. The I/O port can be a serial ATA (SATA), serial ATA express (SATAe), fibre channel, small computer system interface (SCSI), serial attached SCSI, M.2, or peripheral component interconnect express (PCIe).

Chipset management module 112 can reconfigure a chipset of the system 100 based on the detected storage device. For example, the chipset management module 112 can alter the chipset management engine (ME) firmware configuration bits, based on the detection and determination of the type of storage device connected to the I/O port. Power cycle module 114 can perform a power cycle on chipset standby power to trigger a chipset configuration reload. For example, the power cycle module 114 can issue a power cycle (i.e., power off and then on again) on chipset standby power. The power cycle event can trigger a chipset configuration reload, causing the new I/O port mappings to be reflected upon the next power-on sequence of the system 100.

Although the storage device detection module 110, the chipset management module 112, and the power cycle module 114 are shown as separate components, in various examples, the storage device detection module 110, the chipset management module 112, and the power cycle module 114 can be a single component such as a management controller (e.g., a baseboard management controller (BMC)) that can provide out-of-band management functionalities for the system 100. For example, the BMC can perform activities on the system 100 such as reset, power-up, remote console, remotely monitor the health of the system 100 and take corrective actions. By dynamically reconfiguring the I/O port of the system 100 based on detection of installed storage devices, a significant reduction in overhead cost associated with multiple platform SKUs can be achieved.

Figure 2:
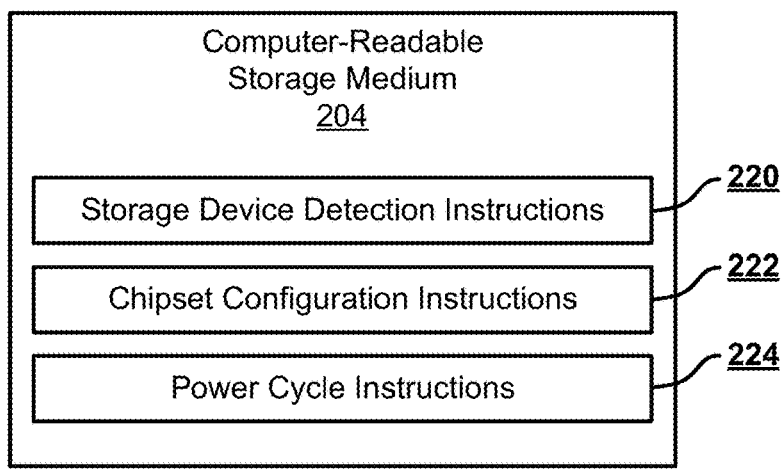
FIG. 2 is a block diagram of a computer-readable storage medium having instructions executable to reconfigure a chipset based on device detection, according to an example.

FIG. 2 is a block diagram of a computer-readable storage medium having instructions executable to reconfigure a chipset based on device detection, according to an example. Computer-readable storage medium 204 may be any electronic, magnetic, optical, or other physical storage device that stores executable instructions. Thus, machine-readable storage medium 204 may be, for example, random access memory (RAM), an electrically-erasable programmable read-only memory (EEPROM), a storage drive, an optical disc, and the like. As described in detail below, machine-readable storage medium 204 may be encoded with executable instructions for reconfiguring a chipset based on device detection.

Storage device detection instructions 220 include instructions to detect that a storage device is connected to an I/O interface of a computing system. For example, the hardware platform personality (i.e., presence and type of storage device connected to the system) can be determined using backplane and system discovery architectures available during a power state (i.e., S0-S5) of the system. Further, via I2C busses connected to the system or directly to the device, the type of storage device connected to the I/O interface can be determined.

Chipset configuration instructions 222 include instructions to reconfigure a chipset of the computing system based on the detected storage device. For example, the chipset ME firmware configuration bits can be altered based on the detected storage device.

Power cycle instructions 224 include instructions to perform a power cycle on chipset standby power to trigger a chipset configuration reload and to update I/O interface mappings upon an occurrence of a subsequent power-on sequence of the computing system. For example, once the discovery process is completed, a power cycle on chipset standby power can be issued. This event can trigger chipset configuration reload and new I/O interface mappings can be reflected upon the next power-on sequence of the system.

Figure 3:
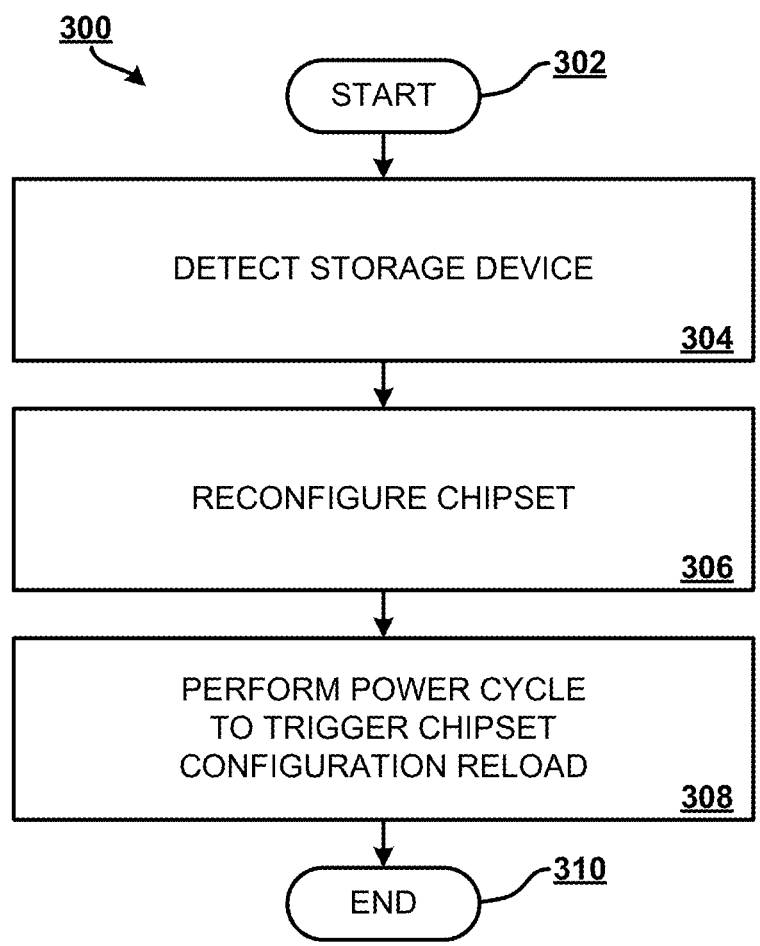
FIG. 3 is a flowchart illustrating a method for reconfiguring a chipset based on device detection, according to an example.

FIG. 3 is a flowchart illustrating a method for reconfiguring a chipset based on device detection, according to an example. Method 300 can be implemented, for example, in the form of executable instructions stored on a non-transitory computer-readable storage medium and/or in the form of electronic circuitry. The example method 300 will now be described with further reference to FIG. 1.

Method 300 includes detecting a storage device, at 304. For example, the storage device detection module 110 can detect that a storage device is connected to an I/O interface of the system 100 and determine the type of storage device. In various examples, the backplane or a number of discovery techniques can be used to detect the storage device. Detecting that the storage device is connected to the I/O interface includes determining a type of the storage device connected to the I/O interface. For example, communication protocols such as I2C can be used to determine the type of storage device connected to the I/O interface, where the I/O interface can be any one of a SATA, SATAe, fibre channel, SCSI, serial attached SCSI, M.2, or PCIe. In various examples, determining the type of storage device can be performed during a standby mode (e.g., S5) or a running mode (S0) of the system 100.

Method 300 includes reconfiguring the chipset, at 306. For example, the chipset management module 112 can reconfigure the chipset of the system 100 based on the detected storage device. In various examples, the chipset management module 112 can alter the chipset ME firmware configuration bits based on the storage device.

Method 300 includes performing power cycle to trigger chipset configuration reload, at 308. For example, the power cycle module 114 can perform a power cycle on chipset standby power to trigger a chipset configuration reload. In various examples, performing the power cycle on chipset standby power includes updating I/O interface mappings upon occurrence of a subsequent power-on sequence of the system 100. In some examples, the method 300 of FIG. 3 includes additional steps in addition to and/or in lieu of those depicted in FIG. 3.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A method, comprising:
   detecting, by a computing system, that a storage device is connected to an input/output (I/O) interface of the computing system;
   reconfiguring, by the computing system, a chipset I/O interconnect configuration of the computing system in response to the detected storage device; and
   performing, by the computing system, a power cycle on chipset standby power to trigger a chipset configuration reload.

2. The method of claim 1, wherein performing the power cycle on chipset standby power comprises updating I/O interface mappings upon occurrence of a subsequent power-on sequence of the computing system.

3. The method of claim 1, wherein reconfiguring the chipset comprises reconfiguring firmware configuration bits of the chipset.

4. The method of claim 1, wherein detecting that the storage device is connected to the I/O interface comprises determining a type of the storage device connected to the I/O interface.

5. The method of claim 4, wherein determining the type of the storage device includes using inter-integrated circuit (I2C) buses for determining the type of storage device connected to the I/O interface.

6. The method of claim 5, wherein determining the type of storage device is performed during a standby mode or a running mode of the computing system.

7. The method of claim 5, wherein the storage device is communicatively coupled to the computing system directly or via a field replaceable unit (FRU).

8. The method of claim 1, wherein the I/O interface is selected from the group consisting of at least a serial ATA (SATA), serial ATA express (SATAe), fibre channel, small computer system interface (SCSI), serial attached SCSI, M.2, and peripheral component interconnect express (PCIe).

9. A computing system, comprising:
   a storage device detection module to detect a storage device connected to an input/output (I/O) port of the computing system and to determine a type of the storage device;
   a chipset management module to reconfigure a chipset I/O interconnect configuration of the computing system in response to the detected storage device; and
   a power cycle module to perform a power cycle on chipset standby power to trigger a chipset configuration reload.

10. The computing system of 9, the power cycle module is further to update I/O port mappings upon an occurrence of a subsequent power-on sequence of the computing system.

11. The computing system of claim 9, the storage device detection module to determine the type of the storage device using inter-integrated circuit (I2C) busses connected to the computing system.

12. The computing system of claim 11, wherein the storage device is communicatively coupled to the computing system directly or via a field replaceable unit (FRU).

13. The computing system of claim 9, wherein the I/O port is selected from the group consisting of at least a serial ATA (SATA), SATA express (SATAe), fibre channel, small computer system interface (SCSI), serial attached SCSI, M.2, and peripheral component interconnect express (PCIe).

14. A non-transitory computer-readable storage medium encoded with instructions executable by a processor of a computing system, the computer-readable storage medium comprising instructions to:
   detect that a storage device is connected to an input/output (I/O) interface of the computing system;
   reconfigure a chipset I/O interconnect configuration of the computing system in response to the detected storage device; and
   perform a power cycle on chipset standby power to trigger a chipset configuration reload and to update I/O interface mappings upon an occurrence of a subsequent power-on sequence of the computing system.

15. The non-transitory computer-readable storage medium of claim 14, wherein instructions to detect that the storage device is connected to the I/O interface comprises instructions to determine a type of the storage device.

* * * * *